(12) United States Patent
Chen et al.

(10) Patent No.: US 7,717,135 B2
(45) Date of Patent: May 18, 2010

(54) ENERGY ATTENUATION DEVICE

(75) Inventors: Yungrwei Chen, West Bloomfield, MI (US); Curtis William Schlak, Livingston County, MI (US)

(73) Assignee: YH America, Inc., Versailles, KY (US)

( * ) Notice: Subject to any disclaimer, the term of this patent is extended or adjusted under 35 U.S.C. 154(b) by 316 days.

(21) Appl. No.: 11/932,838

(22) Filed: Oct. 31, 2007

(65) Prior Publication Data

US 2008/0047623 A1    Feb. 28, 2008

Related U.S. Application Data

(63) Continuation-in-part of application No. 11/739,346, filed on Apr. 24, 2007, now Pat. No. 7,347,222, which is a continuation-in-part of application No. 11/347,207, filed on Feb. 3, 2006, now Pat. No. 7,249,613.

(51) Int. Cl.
*F16L 55/04* (2006.01)
(52) U.S. Cl. .................. 138/30; 138/26; 138/114; 181/225
(58) Field of Classification Search ................. 138/26, 138/30, 109, 112–114; 181/255; 417/540
See application file for complete search history.

(56) References Cited

U.S. PATENT DOCUMENTS

| | | | |
|---|---|---|---|
| 360,326 A | 3/1887 | Richert | |
| 443,220 A | 12/1890 | Detrick | |
| 593,726 A | 11/1897 | Nicholls | |
| 752,175 A | 2/1904 | Monnier | |
| 790,971 A | 5/1905 | Nicholls | |
| 889,423 A | 6/1908 | Wood | |
| 916,136 A * | 3/1909 | Ford | 285/123.17 |
| 1,490,291 A | 4/1924 | Ross | |
| 1,644,794 A | 10/1927 | Saharoff | |
| 2,233,804 A | 3/1941 | Bourne | |
| 2,330,564 A | 9/1943 | Dyer | |
| 2,467,559 A | 4/1949 | Mahlberg | |
| 2,562,101 A | 7/1951 | Hoyle | |
| 2,583,231 A * | 1/1952 | Ragland | 138/30 |
| 2,630,833 A | 3/1953 | Ragsdale | |
| 2,683,973 A | 7/1954 | Mettler | |
| 2,684,692 A | 7/1954 | Hunter at al. | |
| 2,712,831 A | 7/1955 | Day | |
| 2,777,467 A | 1/1957 | Powell et al. | |
| 2,858,854 A | 11/1958 | Daggett | |
| 2,861,595 A * | 11/1958 | Pier | 138/30 |

(Continued)

*Primary Examiner*—Patrick F Brinson
(74) *Attorney, Agent, or Firm*—Dinsmore & Shohl LLP

(57) ABSTRACT

An energy attenuation device for a system adapted to convey pressurized fluid through tubing of the system, comprising a multi-part conduit section for receiving fluid from, and returning fluid to, the tubing, the conduit section including a central portion, two intermediate portions respectively disposed at opposite ends of the central portion, and two end portions respectively disposed at an end of an intermediate portion remote from the central portion. The central portion has at least one aperture in a peripheral surface and a first diameter that is less than a second diameter of the intermediate portions. The end portions have a third diameter that is less than the second diameter. The end portions are received at least partially in the tubing sections. A hose section is disposed about the central portion and at least part of each intermediate portion.

20 Claims, 10 Drawing Sheets

U.S. PATENT DOCUMENTS

| | | | |
|---|---|---|---|
| 2,875,789 A | 3/1959 | Wright | |
| 2,878,835 A * | 3/1959 | Peterson | 138/30 |
| 2,986,169 A | 5/1961 | McCormick | |
| 3,016,503 A | 1/1962 | Pierce | |
| RE25,384 E | 5/1963 | Bryant | |
| 3,134,611 A | 5/1964 | Iverson | |
| 3,164,174 A | 1/1965 | Berthod et al. | |
| 3,215,164 A | 11/1965 | Szczepanski | |
| 3,273,596 A | 9/1966 | Beckett | |
| 3,276,478 A | 10/1966 | Bleasdale | |
| 3,323,305 A | 6/1967 | Klees | |
| 3,376,625 A | 4/1968 | McCulloch | |
| 3,480,105 A | 11/1969 | Burris | |
| 3,527,258 A | 9/1970 | Farr | |
| 3,532,125 A | 10/1970 | Everett et al. | |
| 3,536,102 A * | 10/1970 | Zahid et al. | 138/30 |
| 3,565,338 A | 2/1971 | Wright | |
| 3,582,006 A | 6/1971 | Thompson | |
| 3,610,289 A | 10/1971 | Moon | |
| 3,625,242 A * | 12/1971 | Ostwald | 138/30 |
| 3,744,527 A * | 7/1973 | Mercier | 138/30 |
| 3,842,940 A | 10/1974 | Bonikowski | |
| 3,878,867 A | 4/1975 | Dirks | |
| 3,889,717 A | 6/1975 | Obadal et al. | |
| 3,908,788 A | 9/1975 | Hammarstedt | |
| 3,933,172 A | 1/1976 | Allen | |
| 3,934,824 A | 1/1976 | Fitzhugh | |
| 4,043,539 A | 8/1977 | Gilmer et al. | |
| 4,064,963 A | 12/1977 | Kaan et al. | |
| 4,067,195 A | 1/1978 | Malecha | |
| 4,116,303 A | 9/1978 | Trudell | |
| 4,285,534 A | 8/1981 | Katayama et al. | |
| 4,371,053 A * | 2/1983 | Jones | 181/249 |
| 4,456,034 A | 6/1984 | Bixby | |
| 4,489,759 A | 12/1984 | Yamamura | |
| 4,501,341 A | 2/1985 | Jones | |
| 4,514,141 A | 4/1985 | Marey | |
| 4,611,633 A | 9/1986 | Buchholz et al. | |
| 4,637,435 A | 1/1987 | Chirdon | |
| 4,671,380 A | 6/1987 | Henderson et al. | |
| 4,700,805 A | 10/1987 | Tanaka et al. | |
| 4,732,176 A * | 3/1988 | Sugimura | 138/30 |
| 4,737,153 A | 4/1988 | Shimamura et al. | |
| 4,762,150 A | 8/1988 | Kokuryu | |
| 4,784,648 A | 11/1988 | Singh et al. | |
| 4,787,419 A | 11/1988 | Megee et al. | |
| 4,794,955 A * | 1/1989 | Ejima et al. | 138/30 |
| 4,828,068 A | 5/1989 | Wendler et al. | |
| 4,880,078 A | 11/1989 | Inoue et al. | |
| 4,979,441 A | 12/1990 | Welch et al. | |
| 5,025,890 A | 6/1991 | Hisashige et al. | |
| 5,094,271 A | 3/1992 | Fritz et al. | |
| 5,168,855 A | 12/1992 | Stone | |
| 5,172,729 A | 12/1992 | Vantellini | |
| 5,173,576 A * | 12/1992 | Feuling | 181/247 |
| 5,201,343 A | 4/1993 | Zimmerman et al. | |
| 5,367,131 A | 11/1994 | Bemel | |
| 5,475,976 A | 12/1995 | Phillips | |
| 5,495,711 A | 3/1996 | Kalkman et al. | |
| 5,509,391 A | 4/1996 | DeGroot | |
| 5,539,164 A | 7/1996 | van Ruiten | |
| 5,582,006 A | 12/1996 | Phillips | |
| 5,728,981 A | 3/1998 | van Ruiten | |
| 5,779,355 A | 7/1998 | Pullman | |
| 5,785,089 A | 7/1998 | Kuykendal et al. | |
| 5,941,283 A | 8/1999 | Forte | |
| 5,983,946 A | 11/1999 | Chen et al. | |
| 6,073,656 A | 6/2000 | Chen et al. | |
| 6,085,792 A | 7/2000 | Cooper et al. | |
| 6,089,273 A | 7/2000 | Cooper et al. | |
| 6,119,728 A | 9/2000 | Seidel-Peschmann et al. | |
| 6,123,108 A | 9/2000 | Chen et al. | |
| 6,125,890 A | 10/2000 | Cooper et al. | |
| 6,131,613 A | 10/2000 | Jenski, Jr. et al. | |
| 6,155,378 A | 12/2000 | Qatu et al. | |
| 6,158,472 A | 12/2000 | Hilgert | |
| 6,240,964 B1 | 6/2001 | Cooper et al. | |
| 6,269,841 B1 | 8/2001 | Chen et al. | |
| 6,279,613 B1 | 8/2001 | Chen et al. | |
| 6,338,363 B1 | 1/2002 | Chen et al. | |
| 6,360,777 B1 | 3/2002 | Bae | |
| 6,478,053 B2 | 11/2002 | Zanardi | |
| 6,826,834 B2 * | 12/2004 | Wu et al. | 29/890.08 |
| 7,017,610 B2 | 3/2006 | Zimpfer et al. | |
| 7,549,509 B2 * | 6/2009 | Lucas et al. | 181/249 |
| 2006/0130921 A1 | 6/2006 | Andres | |

* cited by examiner

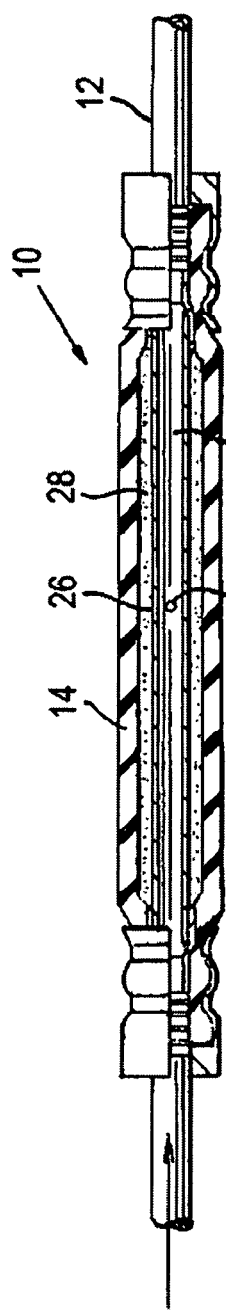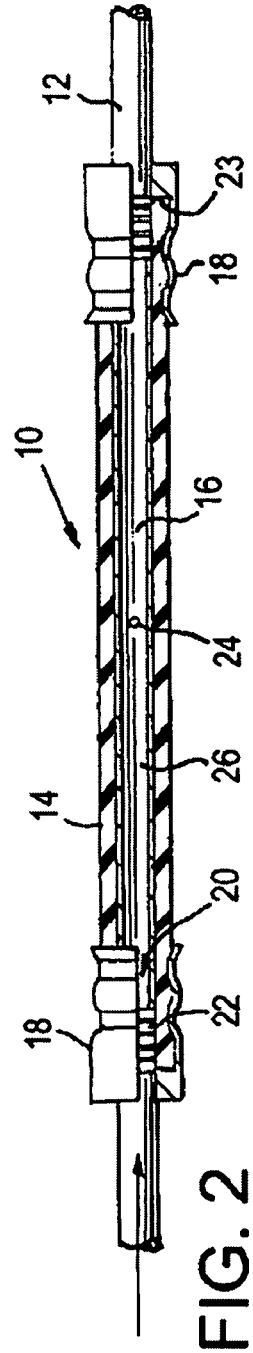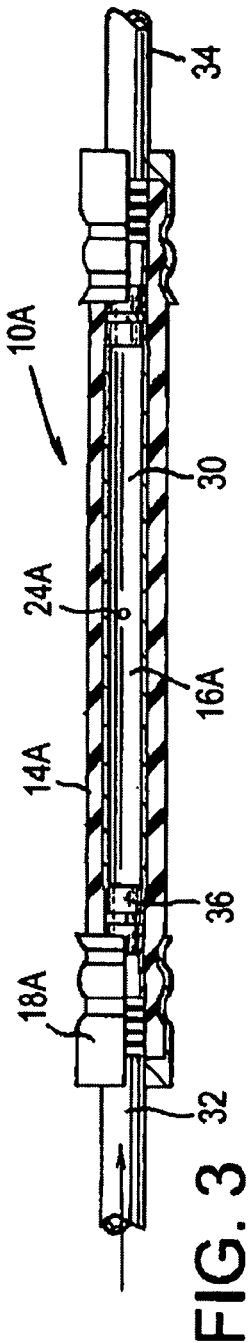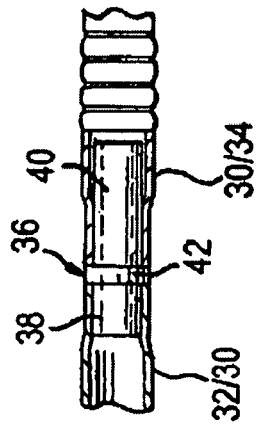

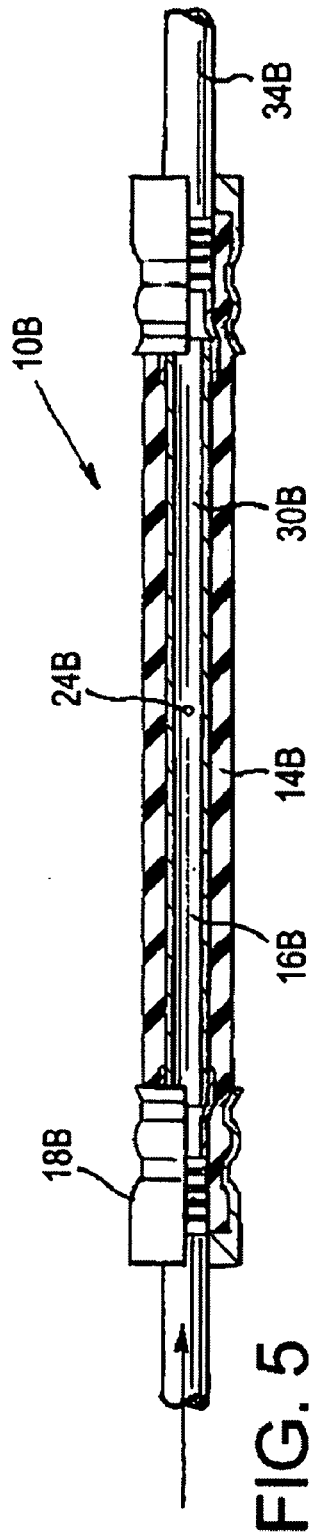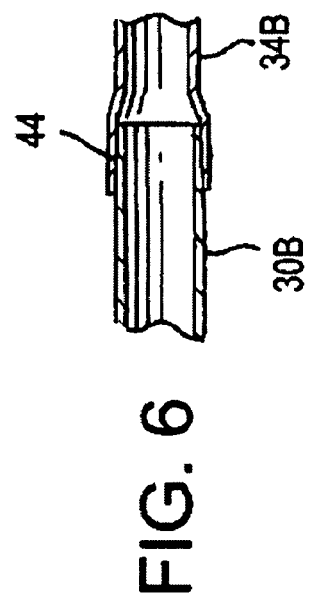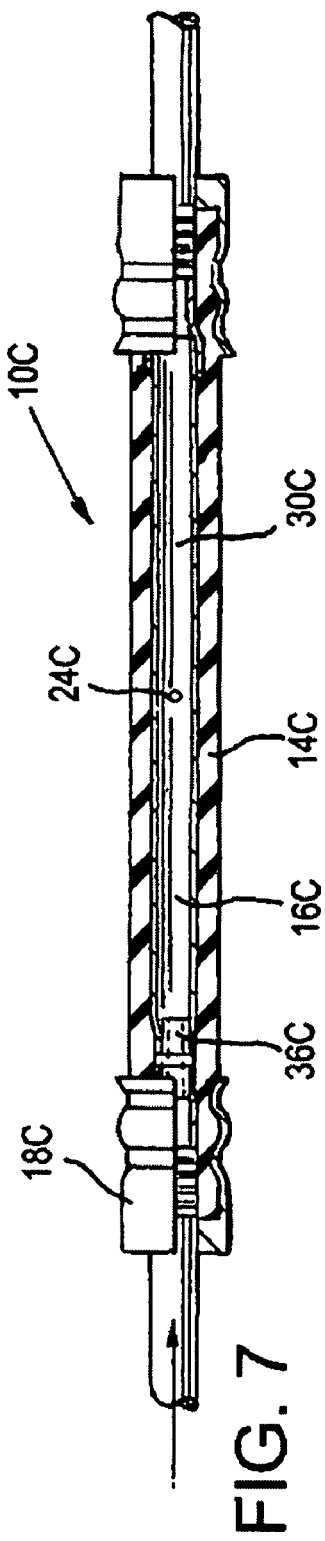

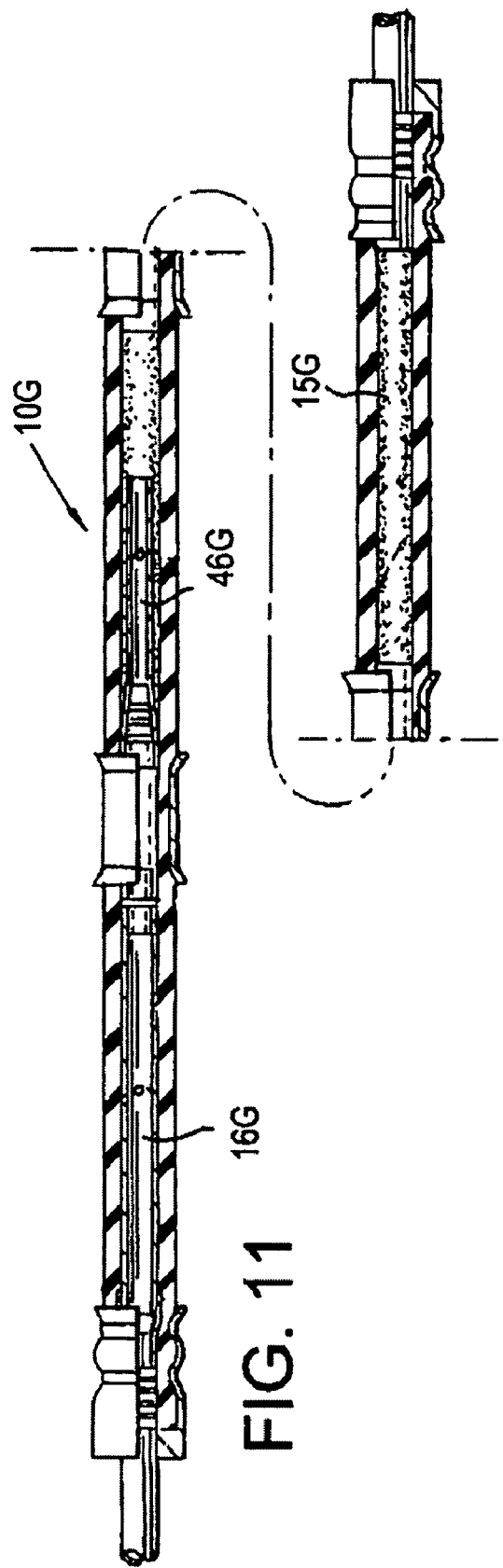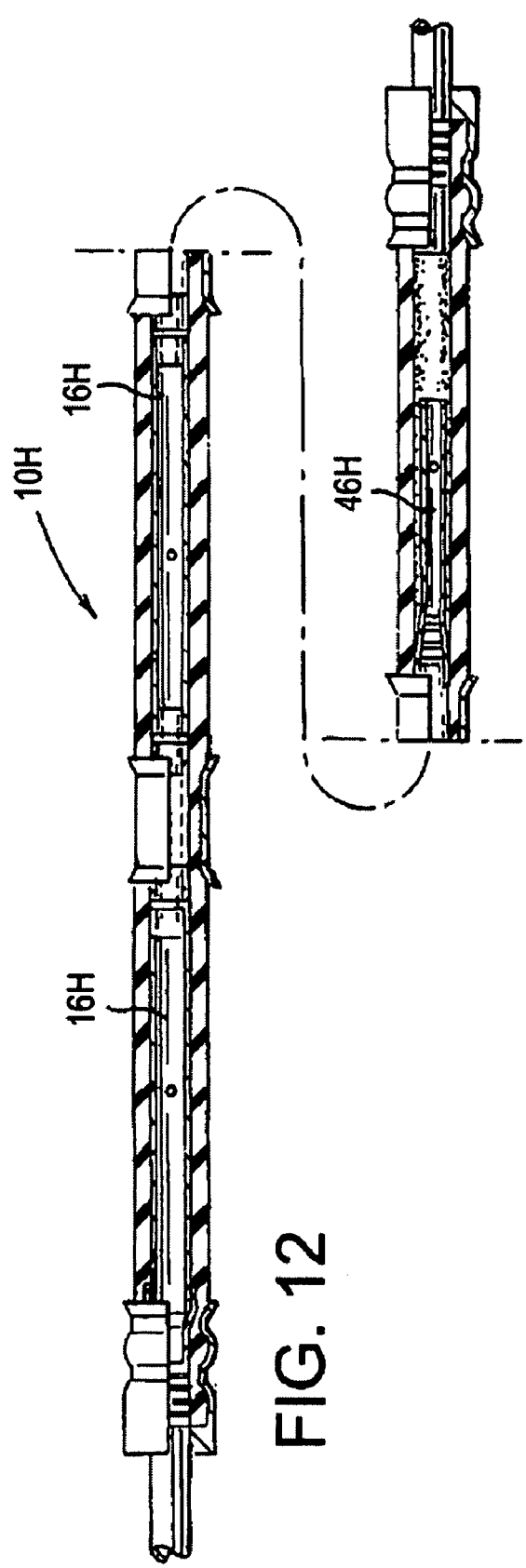

ENERGY ATTENUATION DEVICE

CROSS-REFERENCE TO RELATED APPLICATIONS

This application is a continuation-in-part of application Ser. No. 11/739,346 filed Apr. 24, 2007 now U.S. Pat. No. 7,347,222 which is a continuation-in-part of Ser. No. 11/347,207 filed Feb. 3, 2006 (now U.S. Pat. No. 7,249,613 B1).

BACKGROUND OF THE INVENTION

1. Field of the Invention

This application relates to an energy attenuation device for a system that is adapted to convey a pressurized fluid through tubing of the system. Such a device is particularly suitable for placement in such a system for the attenuation of pressure pulses in the fluid, especially in a hydraulic system of the power steering unit of a vehicle. The inventive device would also be suitable for other hydraulic fluids, or for gases, such as the compressed air of an air conditioning system.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement of the vehicle, such as by barely moving into and out of a parking space or the like while the wheels of the vehicle are being turned by the power steering mechanism thereof. In particular, substantial noise and/or vibration (shudder) can be produced in such a situation when the power steering fluid passes through the power steering mechanism from the fluid pump to the effective steering structure. Further background in this area can be obtained from U.S. Pat. No. 3,323,305, Klees, whereby this U.S. Patent is being incorporated into this disclosure by this reference thereto.

Energy attenuation devices are known where a tube is disposed in a hose. However, in all heretofore known energy attenuation devices, a defined annular space is required to be present between the outer surface of the tube and the inner surface of the hose.

SUMMARY OF THE INVENTION

It is therefore an object of the present application to provide a new device for attenuating energy in a system that conveys fluid under pressure.

This object is realized by an energy attenuation device that comprises a monolithic, multi-part conduit section for receiving fluid from a first section of the tubing and returning the fluid to a second section of the tubing, wherein the conduit section is comprised of a central portion, two intermediate portions respectively disposed at opposite ends of the central portion, and two end portions respectively disposed at an end of one of the intermediate portions remote from the central portion, further wherein the central portion has a first diameter and is provided with at least one aperture in a peripheral surface thereof, further wherein each of the intermediate portions has a second diameter, wherein the second diameter is greater than the first diameter, further wherein each of the end portions has a third diameter, wherein the third diameter is less than the second diameter, and wherein one of the end portions is adapted to be received at least partially in the first section of the tubing and the other of the end portions is adapted to be received at least partially in the second section of the tubing; a hose section is disposed about the central portion and at least a part of each of the intermediate portions. In a non-pressurized state of the conduit, the hose section rests against, i.e. touches, those parts of the intermediate portions about which it is disposed.

The critical aspect of the energy attenuation device of the present application is that when no fluid under pressure flows through the system, the outer hose section rests flushly against part of the conduit section, in other words, in this non-pressurized state there is no annular space between the pertaining parts of the conduit section and the outer hose section, as is the case with all prior known tube-type energy attenuation devices. When fluid under pressure flows through the system, fluid exits the aperture or apertures causing the hose section to expand to thereby provide noise attenuation.

BRIEF DESCRIPTION OF THE DRAWINGS

Other objects, uses and advantages of this invention are apparent from a reading of the specification in conjunction with the accompanying schematic drawings, which form a part thereof and wherein:

FIG. 2 is a cross-sectional view of one exemplary embodiment of an energy attenuation device of this application in a non-pressurized state;

FIG. 2a shows the energy attenuation device of FIG. 2 in a pressurized state;

FIGS. 3-13 are cross-sectional views of further exemplary embodiments of the energy attenuation device of the present application;

DESCRIPTION OF PREFERRED EMBODIMENTS

Figure 1:
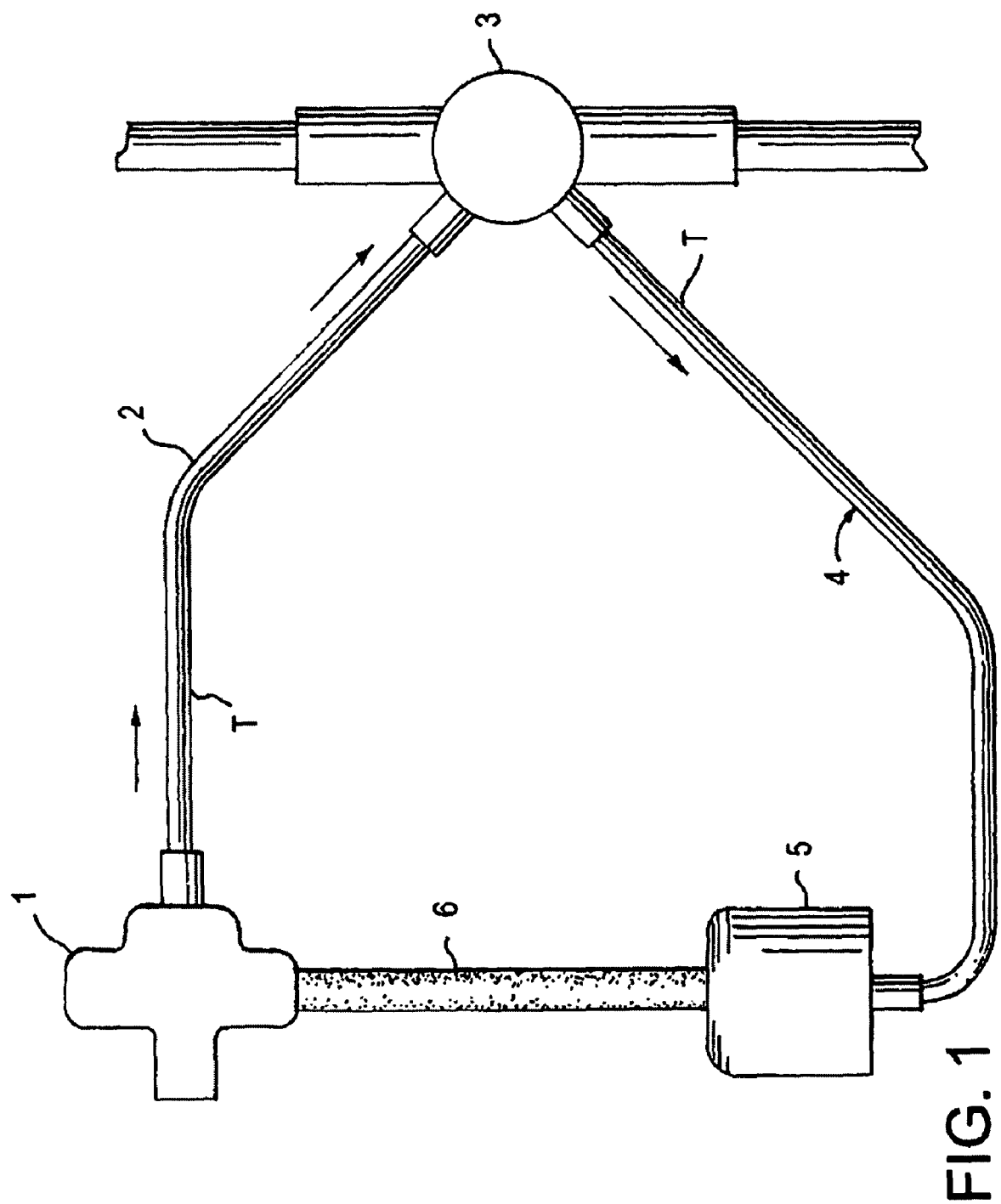
FIG. 1 illustrates a simplified automotive power steering system into which is to be incorporated an embodiment of the energy attenuation device of this application.

While the various features of this invention are hereinafter illustrated and described as providing a sound or energy attenuation device for an automotive power steering system, it is to be understood that the various features of this invention can be utilized singly or in various combinations thereof to provide an energy attenuation device for other systems that convey liquid, especially liquid under pressure, or another fluid, such as air, for example via an air compressor, such as in an air conditioning system.

Therefore, this invention is not to be limited to only the embodiments illustrated in the drawings, because the drawings are merely utilized to illustrate one of the wide variety of usages of this invention.

Referring now to the drawings in detail, FIG. 1 illustrates a simplified automotive power steering system. During operation, the power steering pump 1 generates pressure ripples that are transmitted through tubing T, such as steel or rigid polymeric tubing, as the pressure line 2, to the power steering gear 3, the return line 4, and the reservoir 5, and finally flow back to the pump 1 itself by means of the supply line 6. It should be noted that rather than being separated by a hose or similar conduit, the reservoir 5 and the pump 1 could actually be a single unit.

In order to greatly reduce noise, such as from resonance, for example in the pressure line 2 or in the return line 4, and thereby to eliminate or at least greatly reduce the power steering noise or vibration generated by the power steering pump 1 and/or the power steering gear 3, the energy attenuation device of this application is disposed either in the pressure line 2, between the steering pump 1 and the gear 3, or in the return line 4, between the gear 3 and the reservoir 5 or the pump 1. In addition, it would also be conceivable to dispose the energy attenuation device of the present application in both the pressure line 2 and the return line 4.

Various exemplary embodiments of the energy attenuation device of the present application, which is indicated generally by the reference numeral 10, and components and arrangements thereof, are illustrated in the drawings and will be described in detail subsequently.

FIG. 2 shows one exemplary embodiment of an inventive energy attenuation device 10 for a conduit 12 that is comparable to the tubing T and is adapted to convey a pressurized fluid therethrough. A hose section 14 is disposed about a portion 16 of the conduit 12 that extends from one coupling or sleeve 18 to another coupling or sleeve 18 that is disposed at the opposite end of the conduit portion 16. In particular, the hose section 14 extends from an area 20 below one of the sleeves 18 to the area 20 below the opposite sleeve 18. When no pressurized fluid is flowing through the conduit 12, the hose section 14 rests essentially flushly, i.e. directly, on the conduit portion 16 over the entire length thereof.

The sleeves 18 are provided in order to crimp the hose section 14 onto the conduit portion 16 to thereby provide a fluid-tight connection at that location. It should be noted that other suitable clamping means could also be provided. That part of the conduit portion 16 that is located below the sleeve 18 can be smooth or can be provided with a knurling 22 or other protrusions that are mechanically formed or applied to the conduit portion 16 to enhance a connection between the hose section 14 and the conduit portion 16, so as to prevent the hose section 14 from slipping on the conduit portion 16. In the illustrated embodiment, the hose section 14 extends from one shoulder 23 of the sleeve 18 at one end to the other shoulder 23 of the sleeve 18 provided at the opposite end of the conduit portion 16.

With regard to the reference to a "conduit portion" 16, in the embodiment illustrated in FIG. 2, the conduit 12 is actually a continuous tubing or conduit, with the conduit portion 16 being that portion of such continuous conduit that is disposed between the sleeves 18, or their shoulders 23, and on which is disposed the hose section 14.

For a purpose to be discussed in detail below, the conduit portion 16 is provided with at least one hole or aperture 24 in the peripheral surface 26 of the conduit portion 16. The aperture 24 has a fixed cross-sectional area, and provides communication to the interior of the conduit portion 16. Although the aperture 24 is shown as being centrally disposed, it could be disposed in other positions along the length of the conduit portion. In addition, where a plurality of apertures 24 are provided, they could be disposed in longitudinal and/or peripheral positions. Furthermore, although circular apertures are illustrated, any other shape could also be used.

In FIG. 2, the energy attenuation device 10 is illustrated in a non-pressurized state; FIG. 2a illustrates the situation when liquid under pressure is flowing through the conduit 12. Since the hose section 14 is made of elastomeric material, such as rubber, when liquid under pressure flows through the conduit 12, and enters the conduit portion 16, some of the liquid flows out of the aperture or apertures 24, causing the hose section 14 to expand and therefore be spaced from the surface 26 of the conduit portion 16. This escape of some of the liquid through the apertures 24 into the space 28 thereby formed between the hose section 14 and the conduit portion 16 provides attenuation of the noise and vibration resulting from the aforementioned pressure ripples that are transmitted through the conduit 12. When the pressure of the liquid in the conduit 12 is reduced, fluid returns to the conduit portion 16 from the space 28 through the apertures 24. When the system is entirely depressurized, the flexible hose section 14 once again rests essentially flushly against the surface 26 of the conduit portion 16. It should be noted that due to the fluid-tight connection formed between the hose section 14 and the conduit portion 16 by the sleeves 18, liquid that is present in the space 28 when the system is pressurized does not leak out.

Although in the embodiment illustrated in FIG. 2 the conduit 12 is a continuous tubing or conduit, it has been found according to the teachings of this application that other configurations are also possible. For example, separate conduit sections can be provided, and discrete conduit portions and/or hose sections can be interposed between the conduit sections and connected with at least one of them by appropriate couplings or adapters along with crimping sleeves or the like.

The embodiment of the energy attenuation device 10A illustrated in FIG. 3 differs from that shown in FIG. 2 in that the conduit portion 16A is in the form of a discrete conduit section 30 that is interposed between a first conduit section 32 and a second conduit section 34. The ends of the discrete conduit section 30 are connected to the first and second conduit sections 32 and 34 via appropriate connectors, couplings or adapters 36; an example of such an adapter 36 is shown in greater detail in FIG. 4. As can be seen, the adapter 36 is in the form of a tube, with a first part 38 thereof being inserted into the end of the first conduit section 32 or the discrete conduit section 30 as appropriate, while the second part 40 of the tubular adapter 36 is inserted into an end of the discrete conduit section 30 or the end of the second conduit section 34. If desired, the ends of the conduit sections into which the tubular adapter parts 38, 40 have been inserted can be pressed onto such parts as shown in FIG. 4; alternatively, the parts 38, 40 of the adapter 36 can merely be inserted into the conduit sections. In either case, an optional collar 42 can be provided on the adapter 36 to prevent the adapter parts 38, 40 from being inserted too far into their conduit sections. Rather than the tubular adapter parts 38, 40 being inserted into the conduit sections, the reverse situation can exist. In other words, the tubular adapter parts can have a larger diameter so that the conduit sections can be inserted therein.

In the embodiment of the energy attenuation device 10B illustrated in FIG. 5, rather than providing an adapter between the conduit sections that are to be interconnected, these conduit sections are directly connected to one another, as can be seen more clearly from the enlarged view of FIG. 6. As can be seen from FIG. 6, the end 44 of the conduit section 34B is expanded somewhat to allow insertion of the conduit section 30B. The conduit section 30B can either be inserted loosely into the end 44 of the conduit section 34B, or such end 44 can be pressed onto the conduit section 30B.

The embodiment of the energy attenuation device 10C illustrated in FIG. 7 is provided with different types of connections at each of the ends of the conduit section 30C. In particular, the right end of the conduit section 30C as viewed in FIG. 7 is provided with the type of connection illustrated in FIG. 6, whereas the left end of the conduit section 30C is provided with a connection in the form of the adapter 36 illustrated in FIG. 4. Of course, it is to be understood that these connections could be reversed, so that the adapter type of connection of FIG. 4 is on the right side of the conduit section 30C, and the expanded conduit section connection of FIG. 6 is on the left side of the conduit section 30C.

Although in the embodiments illustrated in FIGS. 3, 5 and 7, the discrete conduit section 30, 30B and 30C has been illustrated as extending from one sleeve to the other, such conduit section could also be a part of one of the conduit sections beyond the respective hose section 14A, 14B or 14C. For example, in FIG. 3, the conduit section 30 could be unitary with or a monolithic part of either the conduit section 32 or the conduit section 34, with the adapter or connection then being present only between the conduit section 30 on the one hand, and the conduit section 34 or 32 on the other hand.

Figure 8:
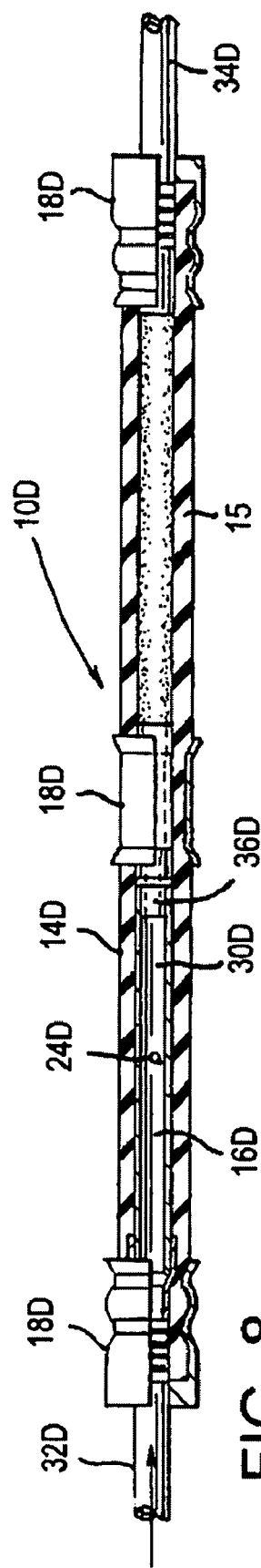

In the embodiment of the energy attenuation device 10D illustrated in FIG. 8, a further hose section 15 is disposed between the discrete conduit section 30D and the second conduit section 34D. The further hose section 15 is empty, in other words, it contains no conduit portion nor any other type of energy attenuation means. The further hose section 15 can be separate from the hose section 14D, or both hose sections can be a unitary or monolithic piece. If the hose sections are separate sections, they could even be further separated from one another by a length of conduit or tubing. By way of example, see FIG. 8a. At any rate, the various sleeves 18D connect the hose section or hose sections 14D, 15 to their respective conduit sections 32D, 30D and 34D.

Although in the embodiment illustrated in FIG. 8 a discrete conduit section 30D is shown, it would again also be possible for the conduit portion 16D to be a unitary part of the first conduit section 32D, with the latter then extending all the way to the connection or adapter 36D, or if no connection means is provided, all the way to the sleeve 18D that connects or crimps the hose sections 14D, 15 to the appropriate conduit portion. This applies to any of the embodiments where a discrete conduit section has been shown.

Also in this embodiment, although specific connection means have been illustrated, such as the adapter 36D and the expansion type connection means at the left side of the drawing, these connection means could be interchanged, only one type of connection means could be used, or if the conduit portion 16D is part of the first conduit section 32D no connection means would be required if the conduit portion 16D extends all the way to below the central sleeve 18D, which is shown as a so-called wedding band coupling.

Figure 9:
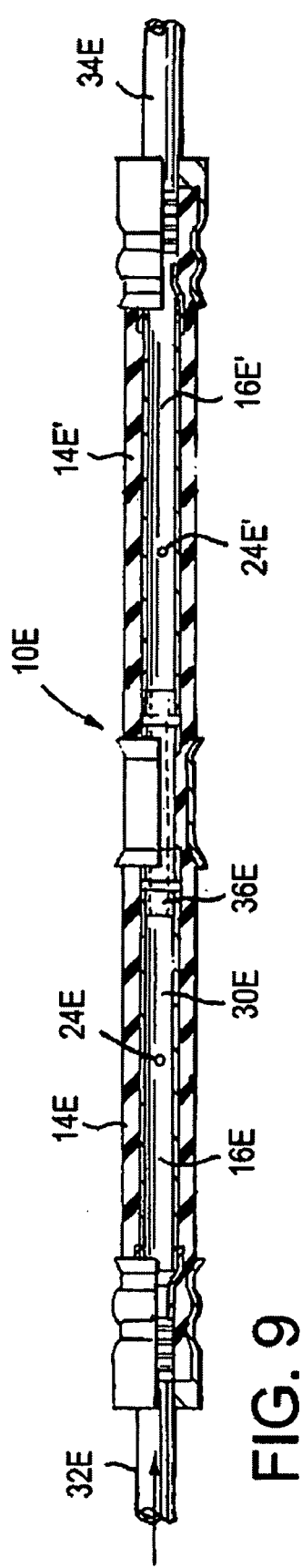

In the embodiment of the energy attenuation device 10E illustrated in FIG. 9, a second conduit portion 16E' is provided. A hose section 14E' is again disposed about the conduit portion 16E'. The hose sections 14E and 14E' can be separate sections, or they can be a monolithic piece. Similarly, the conduit portions 16E and 16E' can be a single section or discrete conduit sections, or they can be parts of the first conduit section 32E and/or the second conduit section 34E respectively. Again, various combinations of connection means can be provided, or connection means can be absent between the conduit portions 16E, 16E' and/or the first and second conduit sections 32E, 34E where the conduit portions 16E, 16E' are parts of such first and/or second conduit sections. In addition, the second conduit portion 16E' is again provided with one or more holes or apertures 24E'.

Figure 10:
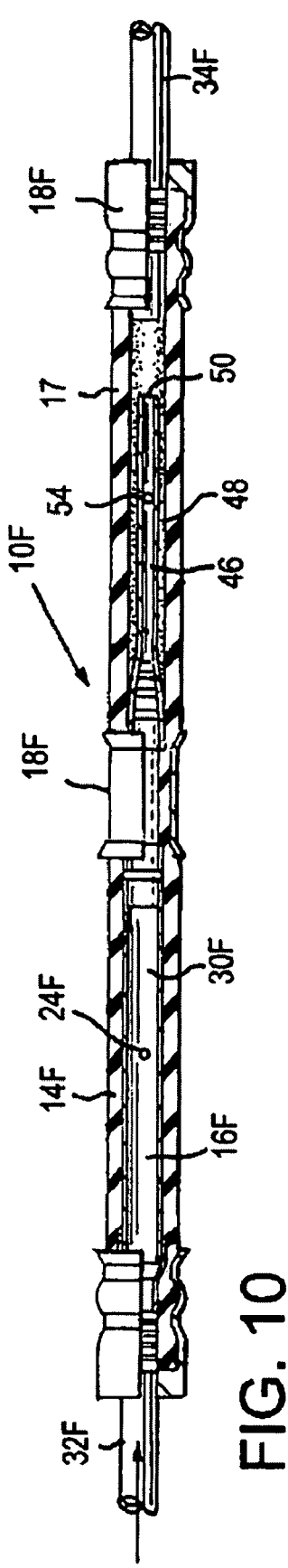

The embodiment of the energy attenuation device 10F illustrated in FIG. 10 differs from that shown in FIGS. 8 or 9 in that a second hose section 17 is provided in which is disposed an energy attenuation means in the form of a tuning cable 46, such as the apertured tubes shown in U.S. Pat. No. 6,338,363, the disclosure of which is incorporated herein by this reference thereto. The tuning cable is disposed in the hose section 17 such that an annular space 48 is defined between the outer peripheral surface of the tuning cable 46 and the inner peripheral surface of the hose section 17. This annular space 48 communicates with the rest of the interior space of the hose section 17 beyond the free end 50 of the tuning cable 46, since the tuning cable is not continuous, i.e. does not extend entirely from the central sleeve 18F all the way to the right hand sleeve 18F. Rather, there is a gap between the free end 50 of the tuning cable 46 and the right hand sleeve 18F. It should also be noted that instead of the arrangement shown, the tuning cable 46 could extend from the right hand sleeve 18F partly toward the central sleeve 18F. In addition, although the tuning cable 46 is shown with one or more surface apertures 54 in the surface thereof, rather than an aperture in the surface of the tuning cable, or in addition thereto, the end 50 of the tuning cable 46 could be open.

It should furthermore be noted that in contrast to the arrangements illustrated in FIGS. 8 and 10, the reverse arrangement of the hose sections and/or conduit portions or tuning cable could be provided.

The embodiment of the energy attenuation device 10G illustrated in FIG. 11 is a combination of the embodiments of FIGS. 8 and 10 to the extent that a first conduit portion 16G, a tuning cable 46G and a further, empty hose section 15G are provided. It is to be understood that these various components need not be provided in the sequence illustrated, but can be provided in any other sequence.

The embodiment of the energy attenuation device 10H illustrated in FIG. 12 is a combination of FIGS. 9 and 10 to the extent that two conduit portions 16H and one tuning cable 46H are provided. It is to be understood that again the sequence of components could be other than that shown. In addition, rather than two conduit portions 16H and one tuning cable 46H, one conduit portion 16H and two tuning cables 46H could be provided, or two conduit portions 16H and a further, empty hose section 15G could be provided. With regard to the embodiments of both FIGS. 11 and 12, again, various connection means can be provided, and not all of the conduit portions need be discrete conduit sections.

It is to be understood that one of skill in the art could readily provide various other combinations of the illustrated embodiments and still be within the scope of the present invention. For example, two empty hose sections 15G could be provided, and/or a situation similar to that shown in FIG. 8a could be present.

It should furthermore be noted that whereas the conduit 12 is generally a steel tubing, although it could also be made of polymeric material, such as tetrafluoroethylene fluorocarbon resins, fluorinated ethylenepropylene resins or polyamide, the discrete conduit sections, such as the conduit section 30 of FIG. 3, can be the same or a different material from that of the conduit 12, especially being made of a polymeric material.

Figure 13:
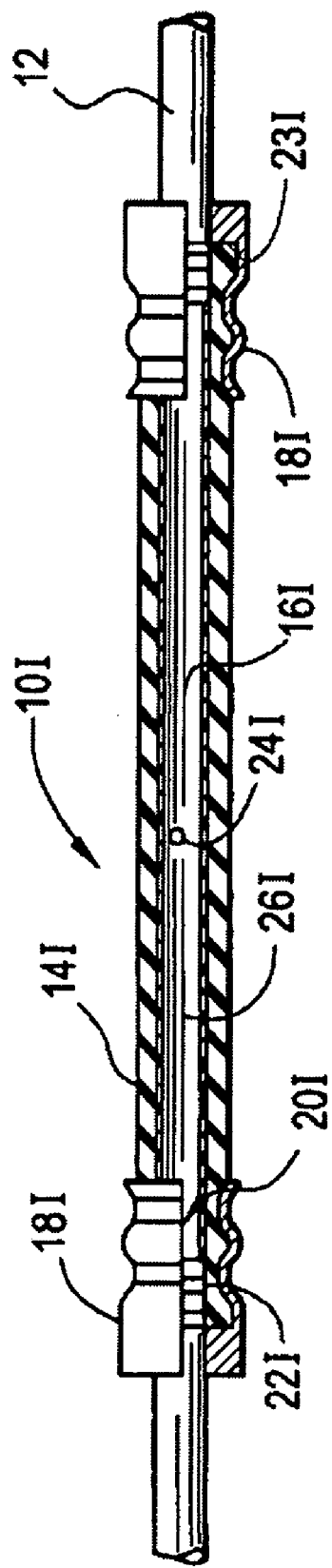

Whereas the conduit 12 and the conduit portion 16 are made of rigid material in the previously-described embodiments, being made, for example, of steel or rigid polymeric material, in the further embodiment of the energy attenuation device 10I illustrated in FIG. 13, the conduit portion 16I is made of flexible material, such as a flexible polymeric material, for example a tetrafluoroethylene fluorocarbon resin or a fluorinated ethylenepropylene resin, or rubber. In the context of the present application, the term flexible is used to mean that the conduit portion 16I, with the hose section 14I disposed thereabout, can be easily or freely bent, yet cannot collapse inwardly.

Again, as described in conjunction with the previous rigid conduit portion embodiments, rather than the conduit 12 being a continuous tubing or conduit, separate conduit sections can be provided, and discrete conduit portions and/or hose sections can be interposed between the conduit sections and connected with at least one of them by appropriate couplings, adapters or other appropriate connection means, including the tubular adapter 36 described in conjunction with FIG. 4, and the direct connection means described in conjunction with FIG. 6. In addition, due to the flexible nature of the conduit portion 16I of the embodiment of the energy attenuation device 10I, it would also be possible to merely push the conduit portion 16I over the tubing 12, an adapter 36, or other appropriate connection or coupling means. Furthermore, a connector and/or the conduit portion 16I can have an appropriate barbed configuration to enhance the coupling.

If a discrete conduit section of flexible material is provided, similar to the discrete conduit sections 30, 30B and 30C of FIGS. 3, 5 and 7, such a conduit section need not merely extend from one sleeve to the other, but could also be part of a conduit section beyond the respective hose section. Thus, the conduit section could be unitary with or a monolithic part of either a conduit section 32 or a conduit section 34 (see FIG. 3), with an adapter or other connection then being present only between the conduit section within the hose section on the one hand, and the conduit section 34 or 32 on the other hand.

Similar to the energy attenuation devices 10D to 10H illustrated in FIGS. 8-12, multiple chambers or hose sections could also be provided, with some of the chambers being empty and/or containing multiple conduit portions 16 or discrete conduit sections 30 of either rigid and/or flexible material. Some of the chambers could also include other types of energy attenuation devices, as shown and described in conjunction with the energy attenuation devices of FIGS. 10-12.

Providing at least one conduit portion 16I or a corresponding discrete conduit section made of flexible material makes it possible to more easily adapt the system to the space available, for example in an engine compartment. Thus, the conduit portions do not have to be pre-bent prior to installation into the engine compartment space.

Although in the illustrated embodiments the conduit portion 16 or discrete conduit section 30 has been shown as being a single and/or continuous component within its hose section 14, i.e. between the sleeves 18, it could also be a split or divided conduit portion, with the parts thereof being interconnected to the adapter 36 of FIG. 4 or any other suitable connection means, including the type of connection shown in FIG. 6. It should also be noted that the aperture 24 could be disposed in the connection means as well as in one or more of the conduit portion parts.

By way of example only, the conduit 12, as well as the various discrete conduit sections 30, can have an outer diameter of 0.95 cm (3/8 inch) or 1.27 cm (1/2 inch), while the hose sections 14, 15 in the non-pressurized state have an inner diameter that is the same as the outer diameter of the conduit 12. These diameters can of course also be smaller or larger. In addition, the apertures 24 can have a cross-sectional diameter of, for example, 0.32 cm (1/8 inch) or 0.64 cm (1/4 inch), or any other suitable dimension.

Although straight conduits and hose sections have been illustrated, curved or bent configurations could also be utilized in order to conform to the installation space that is available, either via a pre-bent conduit portion, or by use of embodiments where the conduit portion is made of flexible material.

In the previously described embodiments a conduit or discrete conduit section of constant diameter has been shown and described. However, it has been found pursuant to the teachings of this application that other configurations are also possible. For example, a multi-part conduit section having differing diameters can also be expedient. Therefore, FIGS. 14 to 16 show a further embodiment of an energy attenuation device, which is designated generally by the reference symbol 10J.

With the energy attenuation device 10J, a one-piece or monolithic, multi-part conduit section 60 is disposed between a first section 62 of the tubing T and a second section 64 of the tubing T.

Figure 15:
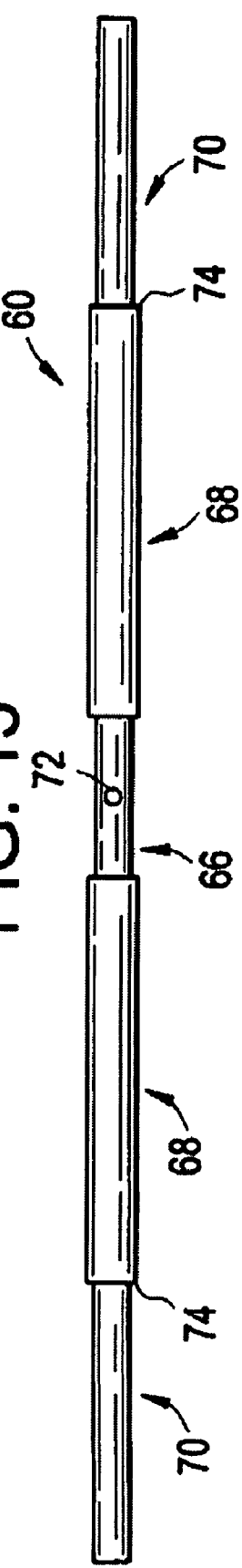
FIG. 15 shows the conduit section of the energy attenuation device of FIG. 14.

As can be seen best in FIG. 15, the conduit section 60 is comprised of a central portion 66, two intermediate portions 68 that are respectively disposed at opposite ends of the central portion 66, and two end portions 70, each of which is disposed at an end of one of the intermediate portions 68 that is remote from the central portion 66. The central portion 66 is provided with at least one hole or aperture 72, which is similar to the aperture 24 described in conjunction with the previous embodiments. As can be seen in FIG. 15, each of the intermediate portions 68 has a diameter that is greater than the diameter of the central portion 66. In addition, each of the end portions 70 has a diameter that is less than the diameter of the two intermediate portions 68, wherein in a presently preferred embodiment the diameter of the end portions 70 is also less than the diameter of the central portion 66, although the diameters could be the same.

Figure 14:
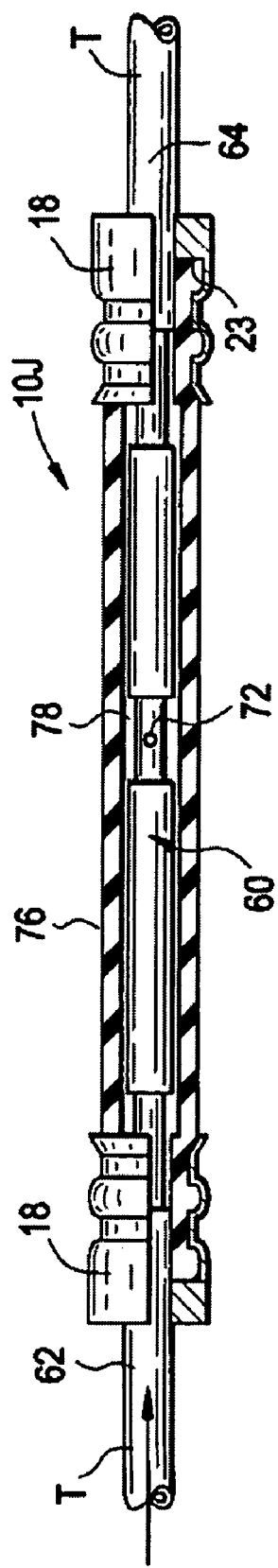
FIG. 14 is a cross-sectional view of another exemplary embodiment of an energy attenuation device of this application in a non-pressurized state.
Figure 16:
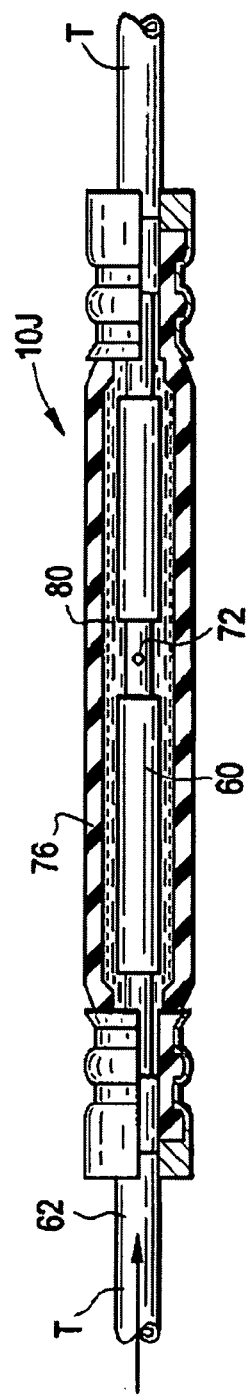
FIG. 16 shows the energy attenuation device of FIG. 14 in a pressurized state.

As can be seen in FIGS. 14 and 16, one of the end portions 70 of the conduit section 60 extends into a first section 62 of the tubing T, while the other end portion 70 extends into the second section 64 of the tubing T, thus obviating the need for a separate adapter or other supplemental connection means.

Although in the illustrated embodiment the tubing sections 62 and 64 are shown as extending up to the respective shoulders 74 between the end portions 70 and the adjacent intermediate portions 68, the end portions need be received only partially in the first and second sections 62 and 64 of the tubing T.

A hose section 76 is disposed about the central portion 66 and at least part if not all of each of the intermediate portions 68. In addition, although in the illustrated embodiment the hose section 76 is shown as extending from one shoulder 23 of the sleeve 18 at one end to the other shoulder 23 of the sleeve 18 provided at the opposite end, this is not absolutely necessary.

At one end of the conduit section 60, for example the left hand inlet end of the illustrated embodiment, the tubing T can be crimped to the pertaining end portion 70 by means of the sleeve 18. Although at the opposite end the tubing T can also be crimped to the pertaining end portion 70, pursuant to a presently preferred embodiment at this end the end portion 70 is merely received by the second section 64 of the tubing T in such a way that it can move axially within the tubing T, for example to compensate for expansion and/or compression of the hose section 76. At both ends of the conduit section 60, the hose section 76 can be secured in place by having the sleeve 18 crimp the hose section 76 to the intermediate portion 68, the end portion 70, or directly to the tubing T.

Since the hose section 76 is disposed at least in part on each of the intermediate portions 68, in the situation where no pressurized fluid is flowing through the conduit section 60 the hose section 76 rests essentially flushly, i.e. directly, on those parts of the intermediate portion 68 about which it is disposed. This situation is illustrated in FIG. 14. In addition, although the central portion 66 has a reduced diameter relative to the two intermediate portions 68, since the hose section 76 is made of elastomeric material, such as rubber, it could even rest to a certain extent, and depending upon the length of the central portion 66 even substantially, directly against the central portion as well. However, a slight gap can also exist between at least part of the peripheral surface of the central portion 66 and the inner surface of the hose section 76 in a non-pressurized state of the system. Such a slight gap is indicated by the reference numeral 78 in FIG. 14. It should be noted that the reduced diameter of the central portion 66 serves to reduce the so-called "water jet" effect when fluid under pressure exits the at least one aperture 72. Thus, the reduced diameter of the central portion 66 serves to reduce or even avoid damage to the adjacent portions of the hose section 76.

Whereas FIG. 14 shows the energy attenuation device 10J in a non-pressurized state, FIG. 16 illustrates the situation when fluid under pressure is flowing through the tubing T and conduit section 60. Since the hose section 76 is made of elastomeric material, such as rubber, when fluid under pressure flows through the tubing T and enters the conduit section 60, some of the fluid exits or flows out of the aperture or apertures 72, causing the hose section 76 to expand and therefore be spaced not only from the central portion 66, but also from the surfaces of the intermediate portions 68, as indicated by the reference numeral 80. As indicated with regard to the description of the previously described embodiments, this escape of some of the fluid through the apertures 72 into the space 80 formed between the hose section 76 and the pertaining portions of the conduit section 60 provides attenuation of the noise and vibration resulting from the aforementioned pressure ripples that are transmitted through the tubing T. When the pressure of the fluid in the conduit section 60 is reduced, fluid returns to the conduit section from the space 80 through the aperture 72. When the system is entirely depressurized, the flexible hose section 76 once again rests directly or flushly against those parts of the intermediate portions 68 about which it is disposed, as well as possibly at least to a certain extent against the surface of the central portion 66.

Again, in a manner similar to the previously described embodiments of energy attenuation devices of the present application, multiple chambers, hose sections, and/or conduit sections can be provided. For example, reference is now made to the energy attenuation device 10K shown in FIG. 17. In particular, this embodiment illustrates a further hose section 82, in which is disposed a further means for attenuating energy in the form of a tuning cable 84, such as the apertured tubes shown in the aforementioned U.S. Pat. No. 6,338,363. The tuning cable 84 is disposed in the hose section 82 such that an annular space 86 is defined between the outer peripheral surface of the tuning cable and the inner peripheral surface of the hose section. This annular space 86 communicates with the remainder of the interior space of the hose section 82 beyond the free end 88 of the tuning cable 84 since the tuning cable is not continuous, i.e. does not extend entirely from the sleeve 18K on the left side of the hose section 82 all the way to the right hand sleeve 18K. Rather, there is a gap between the free end 88 of the tuning cable 84 and the right hand sleeve 18K. As with previously described embodiments, it should again be noted that instead of the arrangement shown, the tuning cable 84 could extend from the right hand sleeve 18K partly toward the left hand sleeve 18K. In addition, although the tuning cable 84 is shown with one or more surface apertures 90, rather than an aperture in the surface of the tuning cable, or in addition thereto, the free end 88 of the tuning cable 84 could be open. For example, in a presently preferred embodiment, the tuning cable has an open free end 88 and no apertures in the peripheral surface thereof.

Although the further means for attenuating energy is shown in the form of a tuning cable, it could also have the form of the previously described conduit section 60, it could have the form of the previously described single conduit portion or discrete conduit sections or be connected to the adjoining tubing, or could have the form of any other suitable energy attenuation means.

Figure 17:
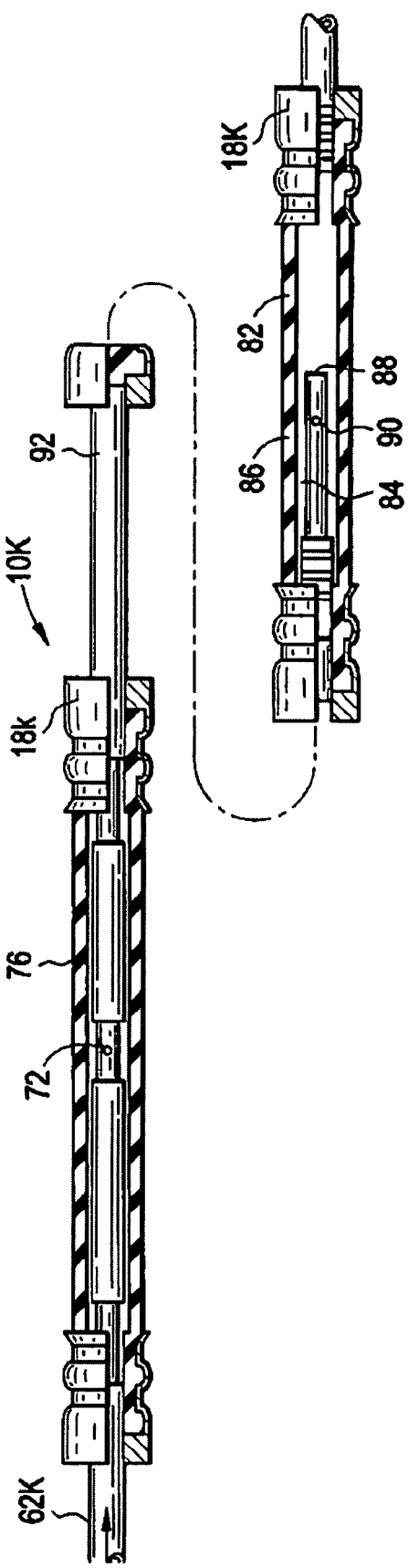
FIG. 17 is a cross-sectional view of a further exemplary embodiment of an energy attenuation device of this application.

In the embodiment illustrated in FIG. 17, the further hose section 82 is shown separated from the hose section 76 by a further section 92 of tubing. However, the two hose sections 76 and 82 could also be a unitary or monolithic piece, such as is illustrated in the embodiments of FIGS. 8-10.

Figure 8A:
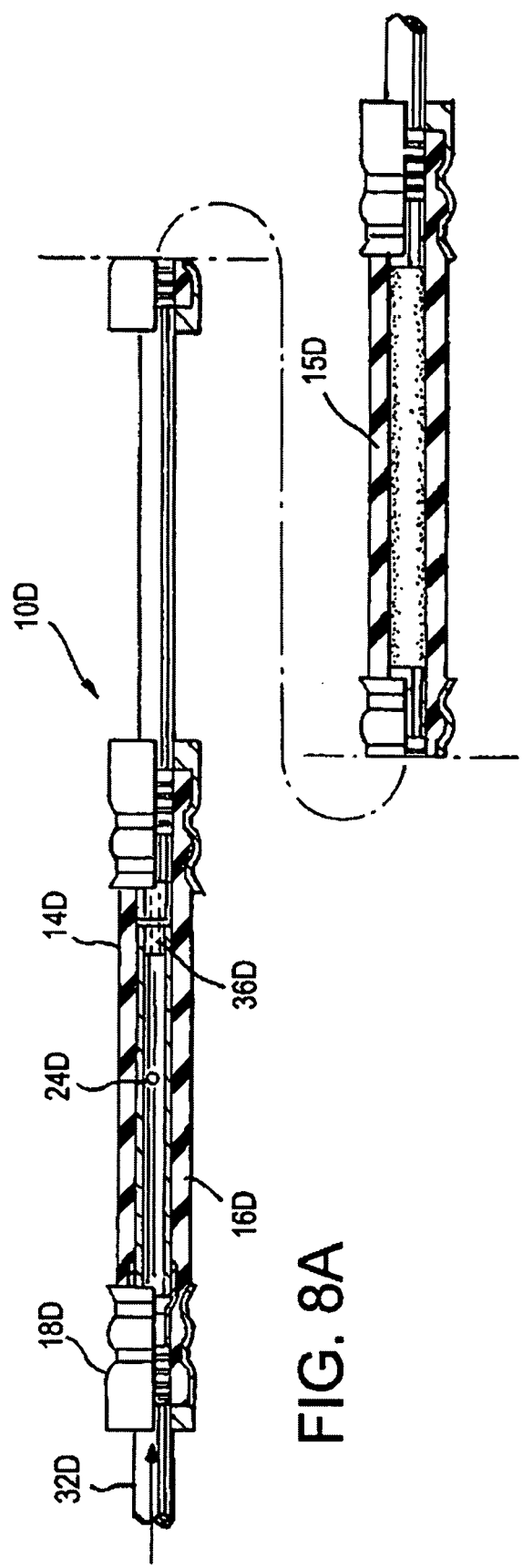

In addition, although the further hose 82 is shown as containing a further means for attenuating energy, the further hose section 82 could also be empty, in other words, it could contain no type of energy attenuation means, similar to the embodiment illustrated in FIG. 8a.

It should again be noted that in contrast to the arrangements illustrated in the various figures, the reverse arrangement of the hose sections or energy attenuations means could be provided.

Also with regard to the use of the multi-part conduit section 60, second and third hose sections can be provided, with all three of the hose sections being disposed in series between the first and second sections 62 and 64 of the tubing T and being in fluid communication with one another, similar to the embodiments illustrated in FIGS. 11 and 12. Thus, in addition to containing the conduit section 60, a further means for attenuating energy can be disposed in one of the hose sections, while another one of the hose sections contains no means for attenuating energy, i.e. is empty, or all of the hose sections can be provided with means for attenuating energy, in any desired sequence.

As discussed in conjunction with the previously described embodiments, the apertures 72 and 90 have a fixed cross-sectional area. Although circular apertures are illustrated, any other shape could be used. Furthermore, rather than being centrally disposed, the apertures could be disposed in other positions along the length of the pertaining conduit sections. In addition, where a plurality of apertures are provided, they could be disposed in any desired longitudinal and/or peripheral position.

Although in the embodiment of the conduit section 60 illustrated in FIG. 15 the at least one aperture 72 is shown as being disposed only in the central portion 66, other configurations are also possible. For example, additional apertures could be provided in one or both of the intermediate portions 68. Therefore, FIG. 18 shows a further embodiment of a monolithic, multi-part conduit section, which is designated generally by the reference numeral 60'.

Figure 18:
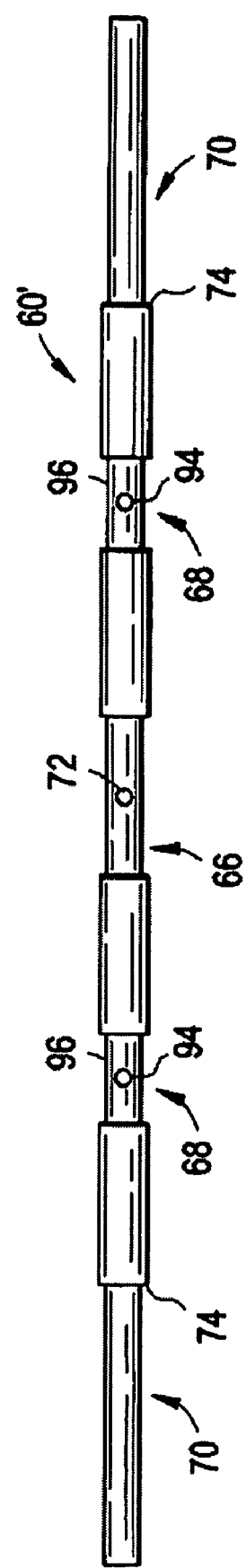
FIG. 18 shows a modified embodiment of the conduit section of FIG. 15.

In the embodiment of the conduit section 60' illustrated in FIG. 18, additional holes or apertures 94 are provided. Although in the illustrated embodiments such additional apertures 94 are shown in both of the intermediate portions 68, it would be possible to provide such additional apertures 94 in only one of the intermediate portions 68. In addition, also with provision of additional apertures 94 in one or both of the intermediate portions 68, it is preferred to provide such apertures in a part of the intermediate portions that have a diameter that is less than the diameter of the rest of the intermediate portions. Thus, in the illustrated embodiment the additional apertures 94 are disposed in the reduced-diameter parts 96 of the intermediate portions 68. Again, the apertures 94 and/or the reduced-diameter parts 96 need not be centrally disposed in the pertaining intermediate portion 68, but could be disposed anywhere along the length thereof. It is to be understood that the apertures 94 and reduced-diameter parts 96 must be disposed in a part of the intermediate portion 68 about which the hose section 76 is disposed.

Although the illustrated embodiments show a straight configuration for the energy attenuation devices, it would also be possible for the device, and in particular the multi-part conduit section 60 thereof, to be prebent so as to have a defined curvature. This can be expedient to accommodate limited installation spaces.

Although the end portions 70 of the multi-part conduit section 60 have been shown and described as having a diameter that is less than the diameter of the pertaining section 62 or 64 of the tubing T, it would also be possible to have a situation such as that described in conjunction with FIG. 6, where one or both of the end portions 70 could have a diameter that more closely approximates the diameter of the tubing T. In this situation, the end of the first or second section 62 or 64 of the tubing T could be expanded somewhat to allow insertion of the pertaining end portion 70 of the conduit section 60. The end portion 70 could be loosely press fit into the expanded tubing section, or the tubing could be crimped against the pertaining end portion 70.

By way of example only, the first and second sections 62 and 64 of the tubing T can have an outer diameter of 0.95 cm (⅜ inch), while the hose section 76 in the non-pressurized state can have an inner diameter that is the same as the outer diameter of the tubing sections. These diameters can, of course, also be smaller or larger. In addition, the central portion 66 can have an outer diameter of 0.85 cm (0.335 inch) and a length of 2.03 cm (0.8 inch). Each of the intermediate portions 68 in this exemplary embodiment can have an outer diameter of 0.95 cm (⅜ inch) and a length of 5.77 cm (2.27 inches). The end portions 70 can have an outer diameter of 0.68 cm (0.266 inch). They can be of the same length, for example 4.19 cm (1.65 inches), or they can also differ in length from one another. For example the end portion 70 at the inlet side could be shorter than the end portion 70 at the outlet side. Finally, the apertures 72 can have a cross-sectional diameter of, for example, 0.32 cm (⅛ inch) or 0.64 cm (¼ inch), or any other suitable dimension.

The conduit section 60 can be made of metal, or a rigid polymeric material, such as tetrafluoroethylene fluorocarbon resins, fluorinated ethylenepropylene resins or polyamide.

The present invention is, of course, in no way restricted to the specific disclosure of the specification and drawings, but also encompasses any modifications within the scope of the appended claims.

What we claim is:

1. An energy attenuation device for a system that is adapted to convey a pressurized fluid through tubing of the system, comprising:

a monolithic, multi-part conduit section for receiving fluid from a first section of said tubing and for returning the fluid to a second section of said tubing, wherein said conduit section is comprised of a central portion , two intermediate portions respectively disposed at opposite ends of said central portion, and two end portions respectively disposed at an end of one of said intermediate portions remote from said central portion, further wherein said central portion has a first diameter and is provided with at least one aperture in a peripheral surface thereof, further wherein each of said intermediate portions has a second diameter, wherein said second diameter is greater than said first diameter, further wherein each of said end portions has a third diameter, wherein said third diameter is less than said second diameter, and wherein one of said end portions is adapted to be received at least partially in said first section of said tubing and the other of said end portions is adapted to be received at least partially in said second section of said tubing; and a flexible hose section disposed about said central portion and at least a part of each of said intermediate portions;

wherein said conduit section including said central portion, two intermediate portions and two end portions are all formed as a unitary, continuous conduit component.

2. An energy attenuation device according to claim 1, wherein said third diameter of said end portions is equal to or less than said first diameter of said central portion.

3. An energy attenuation device according to claim 1, wherein one of said tubing sections is crimped onto the pertaining end portion that is at least partially received in said one tubing section.

4. An energy attenuation device according to claim 3, wherein the other of said tubing sections is not crimped onto the pertaining end portion that is at least partially received therein.

5. An energy attenuation device according to claim 1, wherein in a non-pressurized state of said system, said hose section rests against those parts of each of said intermediate portions about which said hose section is disposed, whereas in a pressurized state of said system, said hose section does not rest against any of said portions of said conduit section.

6. An energy attenuation device according to claim 1, wherein said hose section is fixed onto said first and second sections of said tubing, onto said end portions of said conduit section, or onto said intermediate portions.

7. An energy attenuation device according to claim 6, wherein sleeves are provided for crimping said hose section against said first and second sections of said tubing, against said end portions of said conduits section or against said intermediate portions.

8. An energy attenuation device according to claim 1, wherein said hose section is made of elastomeric material, and said conduit section is made of metal or rigid polymeric material.

9. An energy attenuation device according to claim 1, wherein a further hose section is disposed between, and is in fluid communication with, a section of said tubing and one of said end portions of said conduit section, further wherein said further hose section is separate from or monolithic with said first-mentioned hose section, and wherein said further hose section contains no means for attenuating energy.

10. An energy attenuation device according to claim 1, wherein a further hose section is disposed between, and is in fluid communication with, a section of said tubing and one of said end portions of said conduit section, further wherein said further hose section is separate from or monolithic with said first-mentioned hose section, and wherein said further hose section contains a further means for attenuating energy that is connected to or is part of one of said tubing section and said one end portion of said conduit section in a fluid-conveying manner.

11. An energy attenuation device according to claim 10, wherein said further means for attenuating energy is in the form of a tuning cable, a multi-part conduit section, or a continuous or discrete conduit section having at least one aperture in a peripheral surface thereof and/or an open end.

12. An energy attenuation device according to claim 11, wherein said further means for attenuating energy is in the form of a tuning cable having an open end and no aperture in a peripheral surface thereof.

13. An energy attenuation device according to claim 9, wherein said section of said tubing is said first section or said second section of said tubing, or wherein said section of said tubing is a further length of tubing that separates said further hose section from said one of said end portions of said conduit section 14. An energy attenuation device according to claim 10, wherein said section of said tubing is said first section or said second section of said tubing, or wherein said section of said tubing is a further length of tubing that separates said further hose section from said one of said end portions of said conduit section 15. An energy attenuation device according to claim 1, further comprising second and third hose sections, wherein all three hose sections are disposed in series between said first and second sections of said tubing and are in fluid communication with one another, wherein a further means for attenuating energy is disposed in one of said second and third hose sections and the other of said third and second hose sections contains no means for attenuating energy, or wherein each of said second and third hose sections is provided with a further means for attenuating energy.

16. An energy attenuation device according to claim 15, wherein said further means for attenuating energy is in the form of a tuning cable, a multi-part conduit section, or a continuous or discrete conduit section having at least one aperture in a peripheral surface thereof and/or an open end.

17. An energy attenuation device according to claim 1, wherein at least one additional aperture is provided in a peripheral surface of at least one of said intermediate portions.

18. An energy attenuation device according to claim 16, wherein at least one of said intermediate portions is provided with a reduced-diameter part, and wherein said at least one additional aperture is provided in said reduced-diameter part.

19. An energy attenuation device according to claim 1, wherein said conduit section is linear or has a prebent, curved configuration.

20. A method of attenuating energy in a system that is adapted to convey a pressurized fluid through tubing of the system, including the steps of:

providing a monolithic, multi-part conduit section for receiving fluid from a first section of said tubing and for returning the fluid to a second section of said tubing, wherein said conduit section is comprised of a central portion, two intermediate portions respectively disposed at opposite ends of said central portion, and two end portions respectively disposed at an end of one of said intermediate portions remote from said central portion, further wherein said central portion has a first diameter and is provided with at least one aperture in a peripheral surface thereof, further wherein each of said intermediate portions has a second diameter, wherein said second diameter is greater than said first diameter, and wherein each of said end portions has a third diameter;

disposing one of said end portions at least partially in said first section of said tubing and the other of said end portions at least partially in said second section of said tubing; and disposing a hose section about said central portion and at least a part of each of said intermediate portions, wherein in a non-pressurized state of said system, said hose section rests at least against those parts of said intermediate portions about which said hose section is disposed, whereas in a pressurized state of said system, said hose section does not rest against any of said portions of said conduit section.

* * * * *